United States Patent [19]

Ueda et al.

[11] Patent Number: 5,295,772

[45] Date of Patent: Mar. 22, 1994

[54] TRACTION DRIVE TOOL ADAPTER

[75] Inventors: Kouichi Ueda, Shiki; Shinji Yasuhara, Kashiwara, both of Japan

[73] Assignee: Koyo Seiko Co., Ltd., Osaka, Japan

[21] Appl. No.: 86,769

[22] Filed: Jul. 6, 1993

Related U.S. Application Data

[63] Continuation of Ser. No. 928,413, Aug. 12, 1992, abandoned.

[51] Int. Cl.[5] .......................... B23C 9/00; B23B 39/00; F16H 13/06
[52] U.S. Cl. .................................. 409/232; 475/183; 408/126
[58] Field of Search ............... 409/231, 232, 234; 74/856; 475/158, 159, 165, 166, 183; 408/126, 238, 239 R

[56] References Cited

U.S. PATENT DOCUMENTS

| | | | |
|---|---|---|---|
| 2,731,849 | 1/1956 | Rockwood et al. | 74/867 |
| 4,741,650 | 5/1988 | Nakata | 408/126 |
| 4,950,110 | 8/1990 | Suzuki | 409/232 X |
| 4,960,405 | 10/1990 | Katayama et al. | 475/183 |
| 4,981,403 | 1/1991 | Katayama | 409/136 |
| 5,033,921 | 7/1991 | Yasuhara et al. | 409/135 |

FOREIGN PATENT DOCUMENTS

| | | |
|---|---|---|
| 46351 | 2/1990 | Japan ................. 475/183 |
| 3-51568 | 3/1991 | Japan . |
| 3-213756 | 9/1991 | Japan . |
| 4-39450 | 2/1992 | Japan . |
| 8103554 | 2/1983 | Netherlands . |

OTHER PUBLICATIONS

Abstract of Japanese Appln., pub. no. JP 62118799 May 11, 1992, vol. 011338.

*Primary Examiner*—William Briggs
*Attorney, Agent, or Firm*—Jacobson, Price, Holman & Stern

[57] ABSTRACT

A traction drive tool adapter is adapted to detect an overload on a planetary roller speed increasing mechanism which occurs due to an excessive depth of out, and prevent the breakage of the planetary roller speed increasing mechanism and the imperfect processing of a workpiece. It consists of a rotary portion, and a tool mount portion rotatable with respect to the fixed portion and rotary portion and adapted to attach a tool to a front end section thereof, all of these three portions are put together via a planetary roller speed increasing mechanism. The traction drive tool adapter is further provided with a first revolution speed detecting means provided on the fixed portion and adapted to detect the number of revolutions per unit time of the rotary portion, a second revolution speed detecting means provided on the fixed portion and adapted to detect the number of revolutions per unit time of the tool mount portion, and an abnormal rotation judgement means which is connected to the first and second detecting means so that output signals from these detecting means are input thereinto, and which is adapted to generate an abnormality signal when a speed increasing ratio, is lower than a predetermined level.

2 Claims, 3 Drawing Sheets

TRACTION DRIVE TOOL ADAPTER

This is a continuation of application Ser. No. 07/928,413, filed Aug. 12, 1992, now abandoned.

BACKGROUND OF THE INVENTION

1. Field of the Invention

This invention relates to a traction drive tool adapter to be connected to a main shaft of a machine tool.

2. Description of the Prior Art

A prior art traction drive tool adapter consists of a rotary portion to be inserted firmly into a main shaft of a machine tool, such as a machining center, a fixed portion to be joined detachably to a fixed part of a machine tool, for example, a main shaft head thereof, and a tool mount portion to which a tool is to be attached, all of which three portions are put together via a planetary roller speed increasing mechanism.

In the rotary portion, a hollow shaft provided at the front end thereof, a grooved flange provided at the intermediate section thereof, and a taper shank provided at the rear end thereof are formed unitarily in coaxial relation.

The hollow shaft is provided at its intermediate portion with three cross-sectionally rectangular planetary roller inserting holes extending radially from the outer circumferential surface thereof into a central bore thereof so as to be spaced from one another at a central angle of 120°, and planetary rollers are fixed in these holes fixed rotatably to the hollow shaft via driving pins.

The rotary portion is supported rotatably on the fixed portion via ball-and-roller bearings. A housing of the fixed portion has an annular fixed raceway surface on the inner circumferential surface thereof, and the outer circumferential surfaces of the planetary rollers are engaged with this raceway surface.

The tool mount portion consists of a rotary shaft inserted rotatably in the central bore of the hollow shaft via ball-and-roller bearings, and a rear end portion, which projects rearward from a support region of the ball-and-roller bearings, of this rotary shaft constitutes a sun roller, the outer circumferential surface of which contacts the planetary rollers, a front end portion of the rotary shaft projecting from the front end of the rotary portion so that a tool can be mounted thereon.

After all, the annular fixed raceway surface, planetary rollers and sun roller form a planetary roller speed increasing mechanism, whereby the rotational speed of the rotary portion is increased to cause the tool mount portion to be rotated.

When the prior art traction drive tool adapter described above is used for a cutting and grinding operation, the depth of cut becomes excessively large due to an erroneous operation of an operator or an abnormal shape of a workpiece, so that an overload is imparted to the planetary roller speed increasing mechanism of small dimensions to cause the same mechanism to be broken.

The present invention is adapted to detect an overload on a planetary roller speed increasing mechanism in a traction drive tool adapter and prevent the same mechanism from being broken, for solving the above-mentioned problems.

SUMMARY OF THE INVENTION

The present invention provides a traction drive tool adapter adapted to detect an overload, which occurs due to an excessive depth of cut, on a planetary roller speed increasing mechanism, and prevent the occurrence of breakage of the same mechanism and imperfect processing of a workpiece, whereby the above-mentioned problems with the prior art traction drive tool adapter are solved at once. The traction drive tool adapter according to the present invention has a rotary portion provided at the front half section thereof with an axially extending central bore and fitted firmly at the rear half section thereof in a main shaft of a machine tool, a fixed portion consisting of a housing fitted rotatably around the outer circumferential surface of the front half section of the rotary portion and connected detachably to the fixed part of the machine tool, and a tool mount portion inserted in the central bore in the rotary portion, rotatable with respect to the fixed portion and rotary portion and used to attach a tool to the front end section thereof, all of which three portions are put together via a planetary roller speed increasing mechanism, the tool adapter comprising a first revolution speed detecting means provided on the fixed portion and adapted to detect the number of revolutions per unit time of the rotary portion, a second revolution speed detecting means provided on the fixed portion and adapted to detect the number of revolutions per unit time of the tool mount portion, and an abnormal rotation judgement means which is connected to the first and second detecting means so that output signals from these detecting means are input thereinto, and which is adapted to generate an abnormality signal when a speed increasing ratio, i.e. a ratio of the number of revolutions per unit time of the tool mount portion to that of the rotary portion is lower than a predetermined level.

A rotor may be provided at the outer circumferential part of the front half section of the rotary portion, and a stator in a hollow of the fixed portion so as to be opposed to the rotor, whereby a built-in generator as a power source for the abnormal rotation judgement means may be formed.

When a main shaft of a machine tool provided with a traction drive tool adapter is rotated, the rotary portion is rotated with respect to the housing joined to a fixed portion of the machine tool. Consequently, the planetary rollers, which are supported on the front half section of the rotary portion so that the planetary rollers can be rotated around the main shaft and on their own axes, are rotated on their respective axes as they contact the annular fixed raceway surface of the housing and the outer circumferential surface of the sun roller in the tool mount portion, and also around the axis of the main shaft. As a result, the sun roller, i.e. a tool attached to the tool mount portion is rotated at an increased speed as compared with the speed of the rotary portion, i.e. the main shaft.

An output from the built-in generator, which is energized in accordance with the rotation of the rotor in the rotary portion, with respect to the stator in the fixed portion of the traction drive tool adapter, or an output from some other feed means, both of which outputs are generated during a cutting and grinding operation, is input into the abnormal rotation judgement means.

The number of revolutions per unit time of the rotary portion is detected by the first revolution number detecting means, and that of the tool mount portion by the second revolution number detecting means. The output signals from these detecting means are input into the abnormal rotation judgement means, and a ratio of the number of revolutions per unit time of the rotary portion to that of the tool mount portion, i.e. a detected speed increasing ratio is determined in a detected revolution speed comparison operator circuit, a ratio of this speed increasing ratio to a predetermined value being then determined.

When the planetary roller speed increasing mechanism is operated normally, a detected speed increasing ratio reaches a predetermined level, and an abnormality signal is not outputted from the abnormal rotation judgement means. However, when an overload due to a cutting and grinding resistance based on an excessive depth of cut occurring due to, for example, an erroneous operation of an operator or an abnormal shape of a workpiece is imparted to the planetary roller speed increasing mechanism via a tool during a cutting and grinding operation, slip occurs in the planetary roller speed increasing mechanism.

When a detected speed increasing ratio decreases in consequence to become lower than a predetermined level, an abnormality signal is output from the detected revolution speed comparison operator circuit to inform the operator of the occurrence of an overload, i.e. an abnormal condition of the traction drive tool adapter.

The above and other objects, features and advantages of the present invention will become apparent from reading of the following description which has been made in connection with the accompanying drawings.

BRIEF DESCRIPTION OF THE DRAWINGS

The present invention is illustrated in the following drawings in which.

DESCRIPTION OF THE PREFERRED EMBODIMENT

The traction drive tool adapter embodying the present invention will now be described with reference to the drawings.

Figure 1:
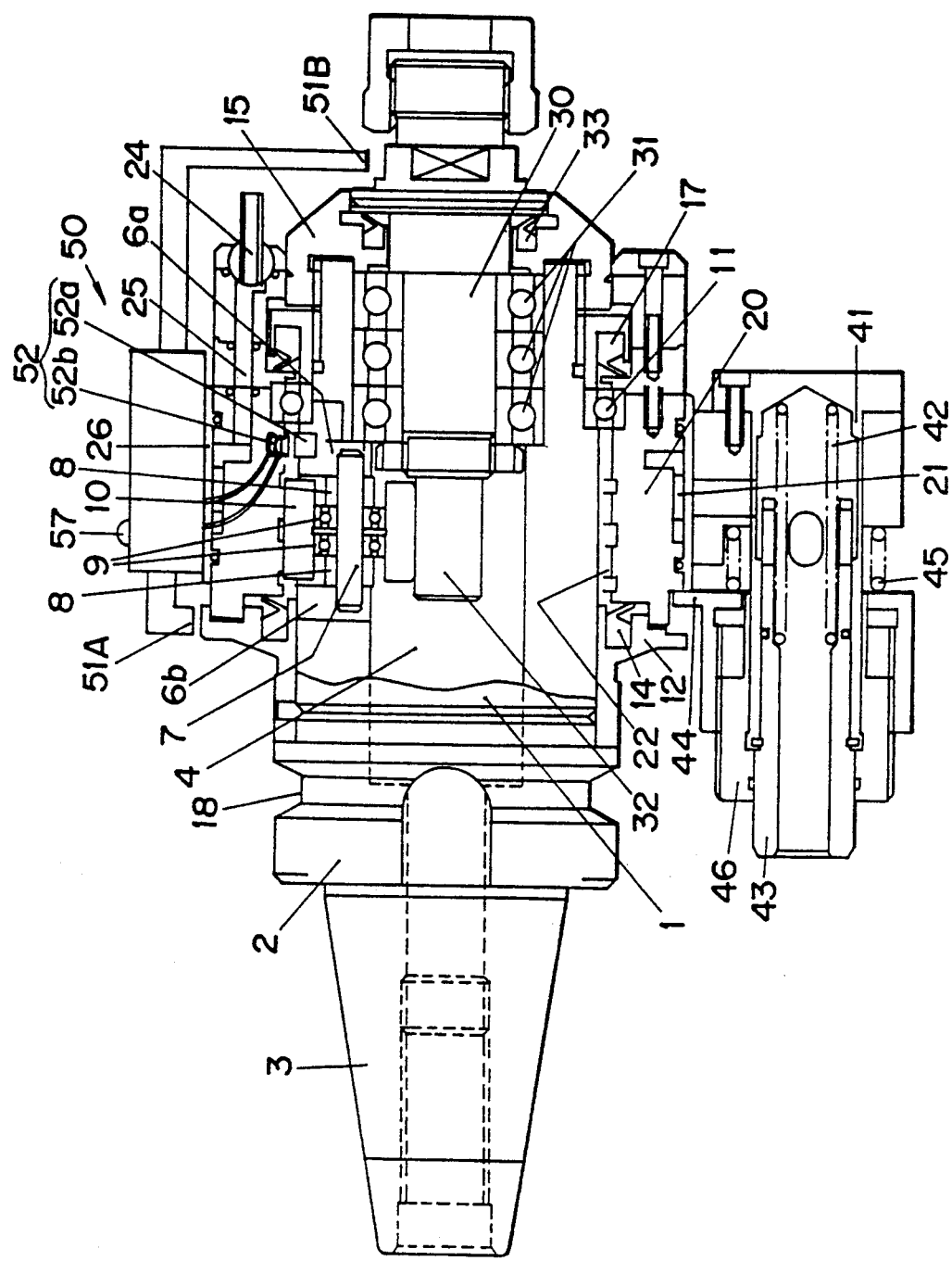
FIG. 1 is a sectioned front elevation of an embodiment of the traction drive tool adapter according to the present invention.

Referring to FIG. 1, a traction drive tool adapter consists of a rotary portion to be inserted firmly into a main shaft of a machine tool, such as a machining center, a fixed portion to be joined detachably to a fixed part of the machine tool, for example, a main shaft head thereof, and a tool mount portion to which a tool is to be attached. In the rotary portion, a hollow shaft 1 provided at the front end thereof, a grooved flange 2 provided at the intermediate section thereof, and a taper shank 3 provided at the rear end thereof are formed unitarily in coaxial relation.

Figure 2:
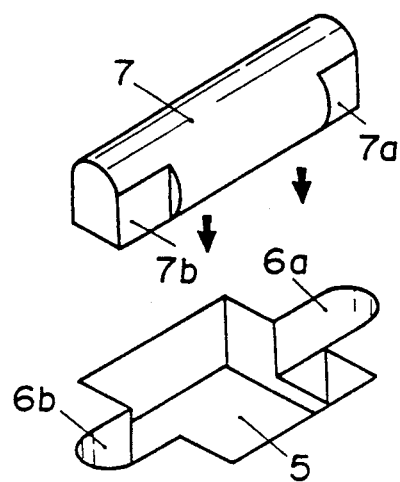
FIG. 2 is a perspective view of a planetary roller inserting hole and a driving pin in the embodiment of the traction drive tool adapter according to the present invention.

The hollow shaft 1 is provided at its intermediate portion with three or four cross-sectionally rectangular planetary roller inserting holes 5 extending radially from the outer circumferential surface thereof into a central bore 4 thereof so as to be spaced from one another at a central angle of 120° to 90°. As shown in FIG. 2, cross-sectionally square planetary roller driving pin mounting recesses 6a, 6b are formed so as to extend continuously from both ends, with respect to the axial direction of the hollow shaft 1, of each of the inserting holes 5. The inner races of a couple of seal-carrying deep grooved ball bearings 9, 9 are fitted around each driving pin 7, which is provided with neck portion 7a, 7b of a substantially square cross section, with the bearings 9, 9 held between sleeves 8, 8, a planetary roller 10 being fitted around the outer races of the same bearings.

In order to mount a driving pin 7 on which a planetary roller 10 is provided on the hollow shaft 1, the planetary roller 10 and sleeves 8, 8 are inserted from the radially outer side of the hollow shaft 1 into the inserting hole 5 in the radial direction, and neck portions 7a, 7b into the mounting recesses 6a, 6b. (Refer to FIG. 2)

Thus, the planetary rollers 10, 10 . . . are positioned axially by the sleeves 8, 8 and deep grooved ball bearings 9, 9 in the inserting holes 5 and mounted rotatably on the hollow shaft 1, and the outer circumferential surfaces of the planetary rollers 10 project by a suitable distance from the corresponding parts of the hollow shaft 1. Accordingly, a suitable clearance can be provided between the outer circumferential surface of the hollow shaft 1 and an annular fixed raceway surface 22 (which will be referred to later).

As will be described later, the hollow shaft 1 in the rotary portion is supported rotatably on the fixed portion via the planetary rollers 10 and a seal-carrying deep grooved ball bearing 11, and the inner races of these ball bearings 11 are fitted to the portions of the outer circumferential surface of the hollow shaft 1 which are at the front ends of the mounting recesses 6a.

A flange 12 is provided on the rear end portion of the outer circumferential surface of the hollow shaft 1. A labyrinth seal and a lip-carrying seal 14 are fitted in the flange 12, and a flange type labyrinth seal and a lip-carrying seal 17 are fitted in a cap-like member 15 fitted around the front end portion of the hollow shaft 1.

The seal-carrying deep grooved ball bearing 11 presses the labyrinth seal and seal 17 so as to seal the central bore 4 and inserting holes 5.

And the input shaft side first revolution speed sensor 51A is installed radially outward from the flange 12, in a position where it is aligned axially with a flange 12 while holding a narrow clearance to the outer periphery of the flange 12.

When the first revolution speed sensor 51A is a magnetic sensor, the flange is made of a magnetic material and a plurality of recess part are machined at circular equal intervals along the periphery of the flange 12. Since recess parts periodically pass sensors confronting the recess parts respectively owing to revolution of the flange 12, electric pulse signals quantitatively equal to the number of passed recess, are output from sensor.

Also, when the first revolution speed sensor 51A is an optical sensor, a plurality of place coming in a surface state where optical reflection factor differs from that of the flange main body are machined at circular equal intervals along the periphery of the flange 12, so as to detect the revolution speed by means of the above-mentioned sensors. Tapes etc. having optical reflection may be pasted at equal intervals instead of the above-mentioned machining.

The grooved flange 2 is provided with an annular groove 18, with which a change hand of an automatic tool changer is to be engaged. A tension rod of the main shaft of a machining center is screwed to a threaded bore made in the rear end surface of the taper shank, and the taper shank is fitted firmly in a taper bore in the main shaft.

The fixed portion consists of a substantially cylindrical housing 20 which is provided with a jacket groove 21 in the outer circumferential surface thereof, an annular fixed raceway surface 22 for planetary rolers in the inner circumferential surface thereof, and a projection, which closely contacts the lip of the seal 17, on the inner circumferential surface of the front end portion thereof, and which contacts the lip of the seal 14 at the rear end surface thereof and has a through bore 25 extending from the jacket groove 21 toward a cutting (grinding) coolant ejection port 24 in the front end surface thereof. A jacket cover 26 covering the jacket groove 21 is fitted around the outer circumferential surface of the rixed portion, sealed with O-rings and fixed via a bonding agent.

A permanent magnet 52a is fixed to the part of the outer circumferential surface of a region on the front side of an inserting hole 5 at the intermediate section of the hollow shaft 1 which has no mounting recesses 6a, and a core-wound generating coil 52b is provided in a position, which is axially in alignment with that of the permanent magnet 52a, on the annular fixed raceway surface 22. A circle passing the front end of the permanent magnet 52a is opposed to the front end of the core with a narrow clearance left therebetween, and the permanent magnet 52a and generating coil 52b form a generator 52 used as a power source for an abnormal rotation judgement means 50 (which will be referred to later).

The housing 20 is further provided with an anti-rotation means 40 on the cater circumferential surface thereof. The anti-rotation means 40 consists of a guide sleeve 41 extending in the axial direction of the main-shaft and fixed to the outer circumferential surface of the housing 20, an anti-rotation pin 43 fitted slidably in the guide sleeve 41 and urged backward by a compression spring 42 in the axial direction of the main shaft, and a regulating sleeve 46 which has a locking claw 44 projecting radially and engageable with and disengageable from the flange 12 fixed to the hollow shaft 1, and which is fitted slidably around the guide sleeve 41 and anti-rotation pin 43 and urged backward by a compression spring 45 in the axial direction of the main shaft. The rear end portion of the anti-rotation pin 43 is adapted to be engaged with a fixed portion of a machining center, for example, a locking recess in an anti-rotation member on the front end surface of a main shaft head when the taper shank 3 is fitted firmly into the main shaft.

In the housing 20 fixed to the outer circumferential surface of the hollow shaft 1, the outer race of the seal-carrying deep grooved ball bearing 11 is positioned in and fixed to a front stepped portion of the annular fixed raceway surface 22 on the inner circumferential surfaces of the planetary rollers 10 . . . are engaged with the annular fixed raceway surface 22, the lip of the seal 14 closely contacting the rear surface of the housing, the lip of the seal 17 closely contacting the projection on the front end portion thereof, the inner circumferential surface of the front end portion of the housing 20 being opposed to the labyrinth seal.

The tool mount portion consists of a rotary shaft 30 inserted rotatably in the central bore 4 of the hollow shaft 1 via triple ball-and-roller bearings (for example, angular ball bearings having ceramic balls) 31, 31, 31.

The outer races of the ball-and-roller bearings 31, 31, 31 are fitted closely in order in the axial direction in the central bore 4 of the hollow shaft 1 and positioned therein with a stepped portion of the inner surface of the bore 4 utilized as an axially extending support surface, and the outer circumferential surface of a rotary shaft 30 is fitted in the inner races of these bearings 31, 31, 31. Namely, the rigidity of the rotary shaft 30 (tool mount portion) in the hollow shaft 1 (rotary portion) is maintained owing to the ball-and-roller bearings 31, 31, 31.

The portion of the rotary shaft 50 which projects to the rear side of the inner races of the ball-and-roller bearings 31, 31, 31 is provided with a sun roller 32, which contacts the outer surfaces of the planetary rollers 10 projecting from the inner side openings of the inserting holes 5.

After all, the annular fixed raceway surface 22, planetary rollers 10 . . . and sun roller 32 form a planetary roller speed increasing mechanism.

The front end portion of the rotary shaft 30 projects from a front end opening of the cap-like member 15 of the rotary portion via a seal 33 and a labyrinth seal, and is formed so that a tool is mounted suitably thereon.

The outer circumferential surface of the front end portion of the rotary shaft 30 is provided with a suitable mark just as the flange 12, an output side second revolution speed sensor 51B, which can be opposed to the mark with a narrow clearance left therebetween just as the first revolution speed sensor 51A is provided in a position in which the sensor 51B is axially aligned with the mark.

Figure 3:
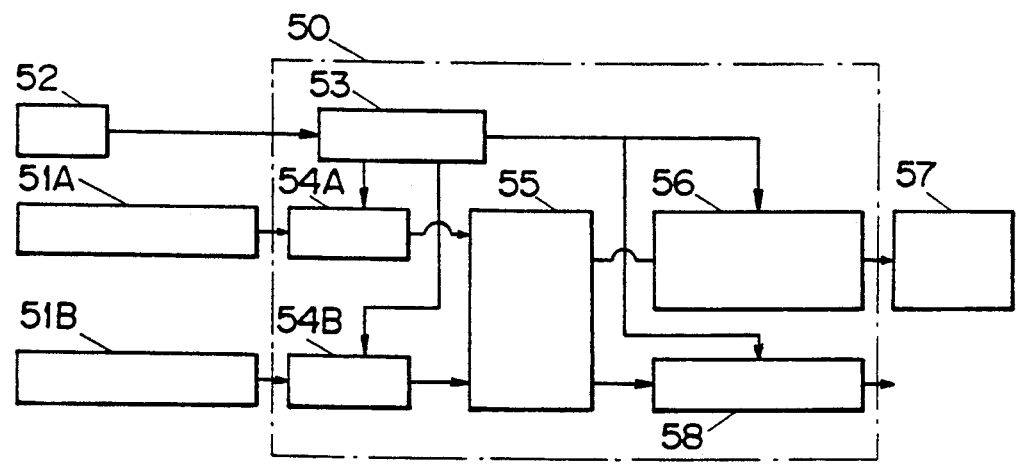
FIG. 3 is a block diagram of an abnormal rotation judgement means in the embodiment of the traction drive tool adapter according to the present invention.

An abnormal rotation judgement means 50 having a circuit shown in FIG. 3 is provided on the outer circumferential surface of the jacket cover 26, and consists of a power source circuit 53 connected to the generator 52, input circuits 54A, 54B, a detected revolution speed comparison operator circuit 55, a light-emitting diode driving circuit 56, a light-emitting diode 57, and a communication output circuit 58 (one of the light-emitting diode driving circuit 56 and light-emitting diode 57, or the signal output circuit 58 can be omitted). The power source circuit 53 is connected so that an input from the generator 52 is supplied suitably therefrom to the input circuits 54A, 54B, detected revolution speed comparison operator circuit 55, light-emitting diode driving circuit 56 and signal output circuit 58.

The power source for the abnormal rotation judgement means 50 may consist of a suitable external power source or an internal battery. However, when an external power source is used, the construction thereof becomes complicated since a current is supplied to a detachable tool adapter, and, when an internal battery is used, it has to be replaced when it has been used up. Therefore, a built-in power source like the generator 52 in the above-described embodiment can be used conveniently.

The first and second revolution speed sensors 51A, 51B are connected so that detected signals are input into the input circuits 54A, 54B, which consist of parts, for example, filters for shaping detected signals of sign waves into detected signals of rectangular waves. These input circuits are connected so that these detected signals the waveforms of which have been charged into rectangular waveforms are input into the detected revolution speed comparison operator circuit 55. The detected revolution speed comparison operator circuit 55 is connected so as to compute a ratio of the number of revolutions per unit time of the input shaft to that of the output shaft, i.e. a speed increasing ratio on the basis of an input shaft side detected signal and an output shaft side detected signal, compare this ratio with a design speed increasing ratio of the planetary roller speed increasing mechanism, and input, when the former ratio is lower than an allowable level, an alarm signal into the light-emitting diode driving circuit 56 and signal output circuit 58.

Figure 4:
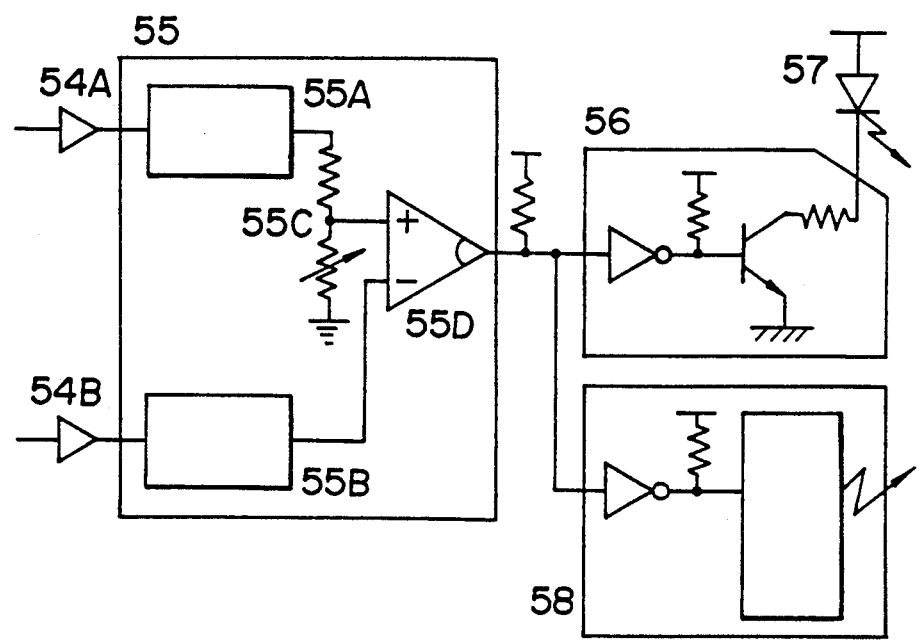
FIG. 4 is a circuit diagram of the abnormal rotation judgement means in the embodiment of the traction drive tool adapter according to the present invention.

In the detected revolution speed comparison operator circuit 55 illustrated in FIG. 4, F-V conversion circuits 55A, 55B are adapted to convert detected signals in the form of pulse frequencies input from the input circuits 54A, 54B into voltage signals. The F-V conversion circuit 55A is connected so that an output therefrom is transformed suitably so as to set an abnormal level through an abnormal level setting potentiometer 55C, and then input into a comparison element 55D, while the F-V conversion circuit 55B is connected so that an output therefrom is input directly into the comparison element 55D. The comparison element 55D is connected so that a voltage signal representative of a difference between both of these input voltage signals and an alarm signal are input into the light-emitting diode driving circuit 56 and signal output circuit 58 respectively.

The operation of the traction drive tool adapter will now be described.

When a shank of a predetermined tool is inserted firmly in the taper bore in the front end portion of the rotary shaft 30, the tool is gripped by the traction drive tool adapter. During this time, the locking claw 44 engaged with a positioning bore, which is formed in the front end surface of the flange 12, by the force of the compression spring 45, and the rotary portion and fixed portion are in fixedly combined relation.

This tool-mounted traction drive tool adapter is stored in a tool magazine in, for example, a machining center, and adapted to be gripped at the annular groove in the grooved flange 2 by a change hand and fixed at a predetermined angle to the main shaft of the machining center. Namely, the taper shank 3 is inserted into the taper bore in the main shaft, and a tension rod of the main shaft is screwed to the threaded bore in the taper shank. When the taper shank 3 is then drawn inward, the traction drive tool adapter is fixed to the main shaft.

During this time, the front end portion of the anti-rotation pin 43 engages the locking recess in the anti-rotation member on the front end surface of the main shaft head, and the anti-rotation pin 43 is moved back against the force of the compression spring 42, the regulating sleeve 46 contacting the front end surface of the anti-rotation member to be moved backward against the force of the compression spring 45, so that the locking claw 44 disengages from the positioning hole in the flange 12. As a result, the fixed portion, i.e. the bossing 20 is fixed, and the rotary portion becomes rotatable along with the main shaft with respect to the fixed portion.

When the main shaft to which the traction drive tool adapter is thus fixed is rotated, the hollow shaft 1 supported on the seal-carrying deep grooved ball bearings 9, 9 is rotated with respect to the housing 20. Accordingly, the planetary rollers 10 contacting the fixed annular raceway surface 22 are rotated on the driving pins 7 and also around the axis of the main shaft. Consequently, the tool mounted on the rotary shaft 30 supported on the sun roller 32 contacting the planetary rollers 10, i.e. the ball-and-roller bearings 31, 31, 31 are rotated at an increased speed as compared with the speed of the main shaft.

A thrust load on the tool is supported on the main shaft via the rotary shaft 30, ball-and-roller bearings 31, 31, 31 and rotary portion.

When a cutting (grinding) operation is carried out by the tool rotated at a high speed, a cutting (grinding) coolant is sent from the jacket groove 21 to the ejection port 24 via the through bore 25 and ejected therefrom onto a part to be processed.

The entry of splash of the cutting (grinding) coolant into the interior of the traction drive tool adapter during a cutting (grinding) process is prevented by the seals 14, 17, 33 while the tool is rotated at a low speed. While the tool is rotated at a high speed, the lips of the seals 14, 17, 33 are bent due to the centrifugal force and leave their closely contacting points so as to prevent the occurrence of frictional heat but such lips are stopped by the adjacent labyrinth seals.

An output from the generator 52 energized by the rotation of the permanent magnet 52a on the rotary portion with respect to the generating coil 52b on the fixed portion of the traction drive tool adapted in cutting and grinding operation is input into the power source circuit 53 in the abnormal rotation judgement means 50, and the power source circuit 53 suitably supplies an input from the generator 52 to the input circuits 54A, 54B, detected revolution speed comparison operator circuit 55, light-emitting diode driving circuit 56 and signal output circuit 58 to operate the abnormal rotation judgement means 50.

In the meantime, the number N1 of revolutions per unit time of the rotary portion, i.e. the hollow shaft 1 is detected by the first revolution speed sensor 51A, and that N2 of revolutions per unit time of the tool mount portion, i.e. the rotary shaft 30 by the second revolution speed sensor 51B. The signals representative of these detected numbers are input in the form of sign waves into the input circuits 54A, 54B in the abnormal rotation judgement means 50 and changed into rectangular waves, which are then input into the detected revolution speed comparison operator circuit 55.

In the detected revolution speed comparison operator circuit 55, a ratio of the number N1 of revolutions per unit time of the hollow shaft 1 to that N2 of the rotary shaft 30, i.e. a detected speed increasing ratio K (=N2/N1) is determined, and a ratio of the detected speed increasing ratio K to a design speed increasing ratio K0 of the planetary roller speed increasing mechanism is also computed.

While the planetary roller speed increasing mechanism is operated normally, $K/K0 \geq M$ (allowable value of, for example, 0.98), and an alarm signal is not output from the detected revolution speed comparison operator circuit 55.

This will now be described with reference to the detected revolution speed comparison operator circuit 55 illustrated in FIG. 4. The pulse frequencies of the detected signals input into the F-V conversion circuits 55A, 55B are converted into voltage signals, and a voltage signal from the F-V conversion circuit 55A is turned into an arbitrarily regulated voltage in the abnormal level setting potentiometer 55C, the voltage being compared with a voltage from the F-V conversion circuit 55B in the comparison element 55D. When there is no difference between these two voltages, an alarm signal is not output from the comparison element 55D.

When an overload for cutting and grinding resistance due to an excessive depth of cut caused by, for example, an erroneous operation of an operator or the abnormal shape of a workpiece is imparted to the rotary shaft 30, i.e. the planetary roller speed increasing mechanism, slip occurs between the outer circumferential surfaces of the sun roller 32 and planetary rollers 10.

As a result, the detected speed increasing ratio K ($=N2/N1$) decreases, and, when $K/K0<M$, an alarm signal is output from the detected revolution speed comparison operator circuit 55 to the light-emitting diode driving circuit 56 and signal output circuit 58, or either one of them. When a difference occurs between an abnormal level voltage set at the abnormal level setting potentiometer 55C and a voltage from the E-V conversion circuit 55B in the circuit of FIG. 4, a differential voltage signal from the comparison element 55D, i.e. an alarm signal is output to the light-emitting diode driving circuit 56 and signal output circuit 58, or either one of them.

The light-emitting diode driving circuit 56 is adapted to light the light-emitting diode 57 when an alarm signal has been input thereinto, and the signal output circuit 58 to output an abnormality signal in the form of an electric wave or infrared rays to a suitable external alarm means when an alarm signal has been input thereinto.

Therefore, it is possible for an operator to audio-visually recognize the occurrence of abnormality, i.e. the occurrence of an overload from the emission of light from the light-emitting diode 57 and an alarm given by an external alarm means. In order to carry out an unmanned operation of a machine tool, a suitable external stop mechanism for stopping the driving of a machine tool in response to a signal, such as an electric wave or infrared rays may be provided.

When a cutting and grinding operation is carried out with the traction drive tool adapter according to the present invention used, slip occurs between the sun roller and planetary rollers due to an overload on the planetary roller speed increasing mechanism which is caused by an excessive depth of cut occurring due to an erroneous operation of an operator or an abnormal shape of a workpiece is detected, whereby the imperfect processing of a workpiece due to the imperfect rotation of a tool and the breakage of the planetary roller speed increasing mechanism due to an overload can be prevented.

While the present invention has been described above with respect to typical preferred embodiments thereof, it should of course be understood that it should not be limited only to them but various changes or modifications may be made without departure from the scope of the invention as defined by the appended claims.

What is claimed is:

1. A traction drive tool adapter having a rotary portion provided at the front half section thereof with an axially extending central bore and fitted firmly at the rear half section thereof in a main shaft of a machine tool, a fixed portion consisting of a housing fitted rotatably around the outer circumferential surface of the front half section of said rotary portion and connected detachably to a fixed part of said machine tool, and a tool mount portion inserted in said central bore in said rotary portion, rotatable with respect to said fixed portion and said rotary portion and used to attach a tool to a front end section thereof, all of which three portions are put together via a planetary roller speed increasing mechanism, comprising a first revolution speed detecting means provided on said fixed portion and adapted to detect the number of revolutions per unit time of said rotary portion, a second revolution speed detecting means provided on said fixed portion and adapted to detect the number of revolutions per unit time of said tool mount portion, and an abnormal rotation judgement means which is connected to said first and second detecting means so that output signals from these detecting means are input thereinto, and which is adapted to generate an abnormality signal when a speed increasing ratio, i.e. a ratio of the number of revolutions per unit time of said tool mount portion to that of said rotary portion is lower than a predetermined level.

2. A traction drive tool adapter according to claim 1, wherein a rotor is provided at the outer circumferential part of a front half section of said rotary portion, a stator being provided in a hollow of said fixed portion so as to be opposed to said rotor, whereby a generator as a power source for said abnormal rotation judgement means is formed.

* * * * *